(12) United States Patent
Zhang et al.

(10) Patent No.: US 12,211,466 B2
(45) Date of Patent: Jan. 28, 2025

(54) DISPLAYING IMAGES OF DIFFERENT DYNAMIC RANGES

(71) Applicant: QUALCOMM Incorporated, San Diego, CA (US)

(72) Inventors: Nan Zhang, Beijing (CN); Ike Ikizyan, San Diego, CA (US); Xinchao Yang, Shanghai (CN); Zhizhou Chen, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/548,179

(22) PCT Filed: Apr. 14, 2021

(86) PCT No.: PCT/CN2021/087135
§ 371 (c)(1),
(2) Date: Aug. 28, 2023

(87) PCT Pub. No.: WO2022/217483
PCT Pub. Date: Oct. 20, 2022

(65) Prior Publication Data
US 2024/0135900 A1 Apr. 25, 2024
US 2024/0233680 A9 Jul. 11, 2024

(51) Int. Cl.
*G09G 5/10* (2006.01)
*G06T 5/90* (2024.01)
(Continued)

(52) U.S. Cl.
CPC ............. *G09G 5/10* (2013.01); *G06T 5/92* (2024.01); *G06V 10/60* (2022.01); *H04N 7/0127* (2013.01);
(Continued)

(58) Field of Classification Search
CPC ... G09G 2340/0428; G09G 2340/0435; G09G 2320/0233; G09G 2320/0626;
(Continued)

(56) References Cited

U.S. PATENT DOCUMENTS 10,963,998 B1 *  3/2021  Baar ..................... G09G 5/10
2010/0271545 A1  10/2010  Mori et al.
(Continued)

FOREIGN PATENT DOCUMENTS

CN   102131056 A   7/2011
CN   107079079 A   8/2017

OTHER PUBLICATIONS

International Search Report and Written Opinion—PCT/CN2021/087135—ISA/EPO—Jan. 19, 2022.
(Continued)

*Primary Examiner* — Dismery Mercedes
(74) *Attorney, Agent, or Firm* — QUALCOMM Incorporated (57) ABSTRACT

Methods and apparatus for graphics processing, such as producing a smooth transition between images of different dynamic ranges (e.g., Standard Dynamic Range (SDR) images and High Dynamic Range (HDR) images). An example method generally includes using a high frame rate during a transition period to allow properties of images to incrementally vary. The properties may include brightness (i.e., luminance), color gamut, tone mapping, among others. For example, during the transition period, a subset of HDR images are displayed at a second frame rate (e.g., 120 Hz) higher than a frame rate based on the HDR images (e.g., 30 Hz). Simultaneously, a brightness level (as well as other aspects) of the display panel is adjusted incrementally from
(Continued)

an SDR brightness level to an HDR brightness level during the transition time period over the subset of the HDR images.

30 Claims, 5 Drawing Sheets

(51) Int. Cl.
*G06T 5/92* (2024.01)
*G06V 10/60* (2022.01)
*H04N 7/01* (2006.01)
*H04N 23/71* (2023.01)

(52) U.S. Cl.
CPC ... *H04N 23/71* (2023.01); *G06T 2207/20208* (2013.01); *G09G 2320/0653* (2013.01); *G09G 2340/0407* (2013.01); *G09G 2340/0435* (2013.01)

(58) Field of Classification Search
CPC ....... G09G 2320/0653; G09G 2360/12; G09G 2330/021; G09G 5/10; G09G 3/2022; G09G 3/204; G09G 2320/103; H04N 23/741; H04N 23/71; H04N 7/0127; H04N 23/6811; H04N 23/743; H04N 5/57; H04N 25/57; G06T 5/90; G06T 2207/20208

See application file for complete search history.

(56) References Cited

U.S. PATENT DOCUMENTS

| | | |
|---|---|---|
| 2011/0249135 A1 | 10/2011 | Minato |
| 2013/0328894 A1* | 12/2013 | Moore ............ H04N 21/41407 345/522 |
| 2014/0002739 A1* | 1/2014 | Kwa ........................ H04N 5/04 348/536 |
| 2017/0295382 A1* | 10/2017 | Su .......................... H04N 19/31 |
| 2018/0262672 A1 | 9/2018 | Woo |
| 2019/0043177 A1* | 2/2019 | Nishimura ................ G06T 5/94 |
| 2019/0141250 A1* | 5/2019 | Nattress ................ G06F 3/1423 |
| 2020/0082760 A1 | 3/2020 | Ogata et al. |
| 2020/0082781 A1* | 3/2020 | An ......................... G09G 5/003 |
| 2020/0294454 A1 | 9/2020 | Tsukagoshi |

OTHER PUBLICATIONS

Supplementary European Search Report—EP21936376—Search Authority—Munich—Oct. 11, 2024.

* cited by examiner

DISPLAYING IMAGES OF DIFFERENT DYNAMIC RANGES

CROSS-REFERENCE TO RELATED APPLICATIONS

This application is a national stage application under 35 U.S.C. 371 of PCT/CN2021/087135 filed Apr. 14, 2021, which is hereby expressly incorporated by reference herein in its entirety as if fully set forth below and for all applicable purposes.

The present disclosure relates generally to processing systems and, more particularly, to one or more techniques for graphics processing.

BACKGROUND

High-dynamic-range video (HDR video) has a dynamic range greater than that of standard-dynamic-range video (SDR video). SDR video describes images, rendering, or video using a conventional gamma curve, presenting a dynamic range that is considered standard. HDR video encoding standards allow for a higher maximum luminance (and/or a lower minimum darkness or maximum blackness) than that of SDR video. For example, HDR video uses a 10-bit color depth or higher; while SDR video normally has 8-bit for non-professional content and 10-bit for professional content. In addition to indicating the ratio between the maximum and minimum luminance, the term "HDR video" may also refer to wide color gamut. As such, HDR video or digital content often contains information for a wide dynamic range and a large color volume.

Modern display panels capable of providing a higher luminance to duly present HDR video or other digital content may be referred to as HDR displays. HDR displays can produce a greater maximum brightness than SDR displays. For example, the brightness or luminance of a display panel may be measured by the unit "nits." HDR displays may reach from upper hundreds to thousands of nits while SDR displays often have only lower hundreds of nits. When HDR displays are capable of playing both SDR videos and HDR videos, abrupt transitions between displaying SDR video and HDR video occur due to the differences in dynamic ranges, disturbingly causing sudden changes in brightness and color gamut to catch watchers' attention. Avoiding or minimizing such abrupt transitions is preferred.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, an apparatus, and a computing device are provided.

In certain aspects, an example device is operable to transition between displaying a first plurality of images including content having a first dynamic range and a second plurality of images including at least some content having a second dynamic range different than the first dynamic range. The device generally includes a display; a memory; and a processor coupled to the memory. The memory and the processor are configured to display, on the display during a first time period at a first brightness level of the display panel, the first plurality of images at a first frame rate. The memory and the processor are further configured to display, on the display during a second time period subsequent to the first time period, a first subset of the second plurality of images at a second frame rate higher than the first frame rate based on the second plurality of images including at least some content having a second dynamic range different than the first dynamic range. A brightness level of the display panel is adjusted incrementally from the first brightness level to a second brightness level during the second time period over the subset of the second plurality of images. The memory and the processor are further configured to display, on the display during a third time period subsequent to the second time period at the second brightness level of the display panel, a second subset of the second plurality of images at a third frame rate lower than the second frame rate.

In certain aspects, an example method is provided for transitioning between displaying a first plurality of images including content having a first dynamic range and a second plurality of images including at least some content having a second dynamic range different than the first dynamic range on a display panel. The method includes displaying, on the display during a first time period at a first brightness level of the display panel, the first plurality of images at a first frame rate. The method includes displaying, on the display during a second time period subsequent to the first time period, a first subset of the second plurality of images at a second frame rate higher than the first frame rate based on the second plurality of images including at least some content having a second dynamic range different than the first dynamic range. A brightness level of the display panel is adjusted incrementally from the first brightness level to a second brightness level during the second time period over the subset of the second plurality of images. The method further includes displaying, on the display during a third time period subsequent to the second time period at the second brightness level of the display panel, a second subset of the second plurality of images at a third frame rate lower than the second frame rate.

Certain aspects of the present disclosure provide a computing device for transitioning between displaying a first plurality of images including content having a first dynamic range and a second plurality of images including at least some content having a second dynamic range different than the first dynamic range on a display panel. The computing device includes means for displaying, on the display during a first time period at a first brightness level of the display panel, the first plurality of images at a first frame rate. The computing device includes means for displaying, on the display during a second time period subsequent to the first time period, a first subset of the second plurality of images at a second frame rate higher than the first frame rate based on the second plurality of images including at least some content having a second dynamic range different than the first dynamic range. A brightness level of the display panel is adjusted incrementally from the first brightness level to a second brightness level during the second time period over the subset of the second plurality of images. The computing device further includes means for displaying, on the display during a third time period subsequent to the second time period at the second brightness level of the display panel, a second subset of the second plurality of images at a third frame rate lower than the second frame rate.

Certain aspects of the present disclosure provide a non-transitory computer readable medium storing instructions that when executed by a computing device as discussed herein cause the computing device to transition displaying a first plurality of images including content having a first dynamic range to a second plurality of images including at least some content having a second dynamic range different than the first dynamic range on a display panel. For example, the non-transitory computer readable medium stores instructions that, when executed by a computing device, cause the computing device to display, on the display during a first time period at a first brightness level of the display panel, the first plurality of images at a first frame rate. The display panel refresh interval of the display panel corresponds to a time duration of a display period of the display panel. The display panel may be configured to refresh each display period. The non-transitory computer readable medium stores instructions that, when executed by a computing device, further cause the computing device to display, on the display during a second time period subsequent to the first time period, a first subset of the second plurality of images at a second frame rate higher than the first frame rate based on the second plurality of images including at least some content having a second dynamic range different than the first dynamic range. A brightness level of the display panel is adjusted incrementally from the first brightness level to a second brightness level during the second time period over the subset of the second plurality of images. The non-transitory computer readable medium stores instructions that, when executed by a computing device, further cause the computing device to display, on the display during a third time period subsequent to the second time period at the second brightness level of the display panel, a second subset of the second plurality of images at a third frame rate lower than the second frame rate.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Like numerals indicate like elements.

DETAILED DESCRIPTION

The present disclosure provides techniques to smoothly transition between images of different dynamic ranges. For example, high dynamic range (HDR) images may require a substantially brighter luminance output of a display than standard dynamic range (SDR) images. When HDR images and SDR images are displayed in sequence, the sudden change of brightness and/or color gamut may cause unease or abrupt attention in users. In order to allow watchers to naturally and smoothly adapt to the high brightness and/or color saturation of the HDR images, the present disclosure provides techniques for processing and generating transition content that reduce the impact to the experience continuity. The disclosed techniques allow watchers to be aware of the HDR images without noticing glitches, jamming, or switching sensations.

In an example aspect, the present disclosure provides methods, devices, and systems for transitioning between displaying a first plurality of images including content having a first dynamic range and a second plurality of images including at least some content having a second dynamic range different than the first dynamic range on a display panel. The techniques include displaying a first number of images (e.g., SDR images) at a first frame rate, on a display panel during a first time period at a first brightness level of the display panel. The techniques further include displaying, on the display during a second time period subsequent to the first time period, a first subset of the second plurality of images at a second frame rate higher than the first frame rate based on the second plurality of images including at least some content having a second dynamic range (e.g., HDR images) different than the first dynamic range. In some cases, the techniques may adjust a brightness level of the display panel incrementally from the first brightness level to a second brightness level during the second time period over the subset of the second plurality of images. The techniques further include displaying, on the display during a third time period subsequent to the second time period at the second brightness level of the display panel, a second subset of the second plurality of images at a third frame rate lower than the second frame rate. Details of these aspects of techniques are further discussed below.

For example, when a display panel transitions from displaying SDR images to displaying HDR images, the display panel may increase the frame rate during a transition time period. For example, the transition frame rate may be (e.g., much) higher than the inherent frame rates of the SDR images or the HDR images. In an example, if the HDR images have a frame rate of 30 Hz, the transition frame rate may be 120 Hz. If the transition period is 1 second (or 1000 ms), then there will be 120 frames between the SDR and HDR images for the transition. The brightness, color gamut, and/or other visual properties of the transition frames may incrementally (e.g., linearly, nonlinearly, etc.) vary to achieve a smooth transition. In some cases, the transition time period may be longer or shorter, or the frame rate may vary based on the SDR or HDR images.

Various aspects of systems, apparatuses, computer program products, and methods are described more fully hereinafter on transitioning between visual content of different dynamic ranges. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method, which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different graphics technologies, system configurations, etc., some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, or a single device having multiple pipelines, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may be interchangeable with the term "image" or "images." That is, "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit (DPU). Graphical content may be processed to become display content. For example, a graphics processing unit may output graphical content, such as a frame, to a buffer (which may be referred to as a framebuffer). A DPU may read the graphical content, such as one or more frames from the buffer, and perform one or more display processing techniques thereon to generate display content. For example, a DPU may be configured to perform composition on one or more rendered layers to generate a frame. As another example, a DPU may be configured to compose, blend, or otherwise combine two or more layers together into a single frame. A DPU may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

Figure 1:
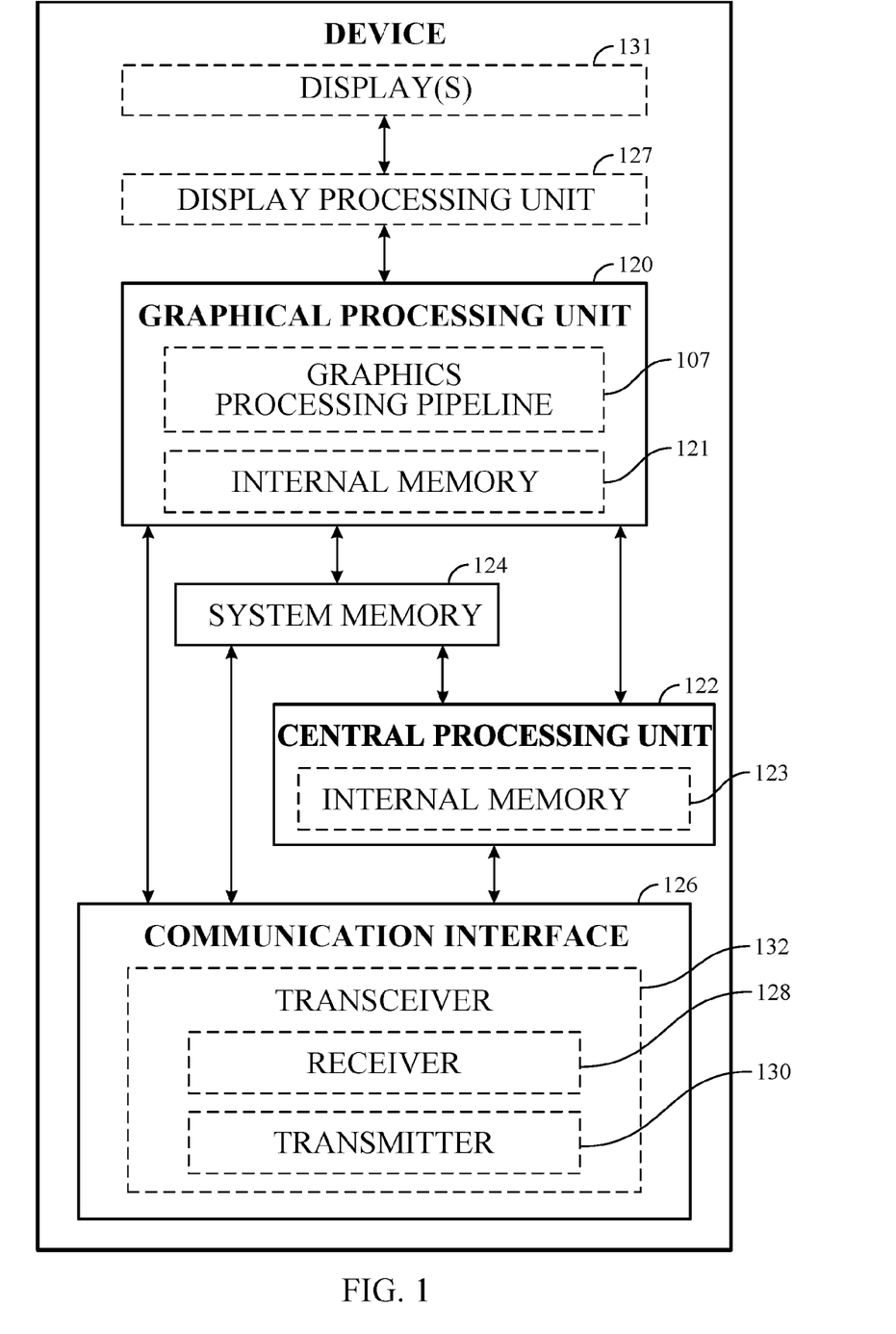
FIG. 1 is a block diagram that illustrates an example computational system, in accordance with certain aspects of the present disclosure.

FIG. 1 is a block diagram that illustrates an example computational system 100 configured to implement one or more techniques of this disclosure. The computational system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a GPU 120, a CPU 122, and a system memory 124. In some aspects, the device 104 can include a number of optional components, e.g., a communication interface 126, a transceiver 132, a receiver 128, a transmitter 130, a DPU 127, and one or more displays 131.

Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The GPU 120 may include an internal memory 121. The GPU 120 may be configured to perform graphics processing, such as in a graphics processing pipeline 107. The CPU 122 may include an internal memory 123. In some examples, the device 104 may include a display processor, such as the DPU 127, to perform one or more display processing techniques on one or more frames generated by the GPU 120 before presentment by the one or more displays 131. The DPU 127 may be configured to perform display processing. For example, the DPU 127 may be configured to perform one or more display processing techniques on one or more frames generated by the GPU 120. The one or more displays 131 may be configured to display or otherwise present frames processed by the DPU 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the GPU 120 and the CPU 122, such as system memory 124, may be accessible to the GPU 120 and the CPU 122. For example, the GPU 120 and the CPU 122 may be configured to read from and/or write to external memory, such as the system memory 124. The GPU 120 and the CPU 122 may be communicatively coupled to the system memory 124 over a bus. In some examples, the GPU 120 and the CPU 122 may be communicatively coupled to each other over the bus or a different connection.

The CPU 122 may be configured to receive graphical content (such as SDR and HDR images, of content of different dynamic range or characteristics) from any source, such as the system memory 124, and/or the communication interface 126. The system memory 124 may be configured to store received encoded or decoded graphical content. The CPU 122 may be configured to receive encoded or decoded graphical content, e.g., from the system memory 124 and/or the communication interface 126, in the form of encoded pixel data. The CPU 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The GPU 120 may be a general purpose GPU (GPGPU), or any other processing unit that may be configured to perform graphics processing. In some examples, the GPU 120 may be integrated into a motherboard of the device 104. In some examples, the GPU 120 may be present on a graphics card that is installed in a port in a motherboard of the device 104, or may be otherwise incorporated within a peripheral device configured to interoperate with the device 104. The GPU 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the GPU 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The CPU 122 may be any processing unit configured to send instructions to the GPU 120 and perform general computational processing (e.g., non-graphical processing). In some examples, the CPU 122 may be integrated into a motherboard of the device 104. The CPU 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the CPU 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the computational system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular hardware component (e.g., a GPU), but, in further embodiments, can be performed using other hardware components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Example Transition Between Images of Different Dynamic Ranges

The present disclosure relates generally to processing systems and, more particularly, to one or more techniques for graphics processing. For example, as discussed, by introducing transition frames at a different frame rate from the content to be displayed, and incrementally changing certain properties from a first content of a first dynamic range to a second content of a second dynamic range, the present disclosure provides a smooth transition between images of different dynamic ranges. In some cases, the certain properties include brightness, color gamut, and/or tone mapping. A large number of transition frames may achieve a smooth transition effect.

Figure 2:
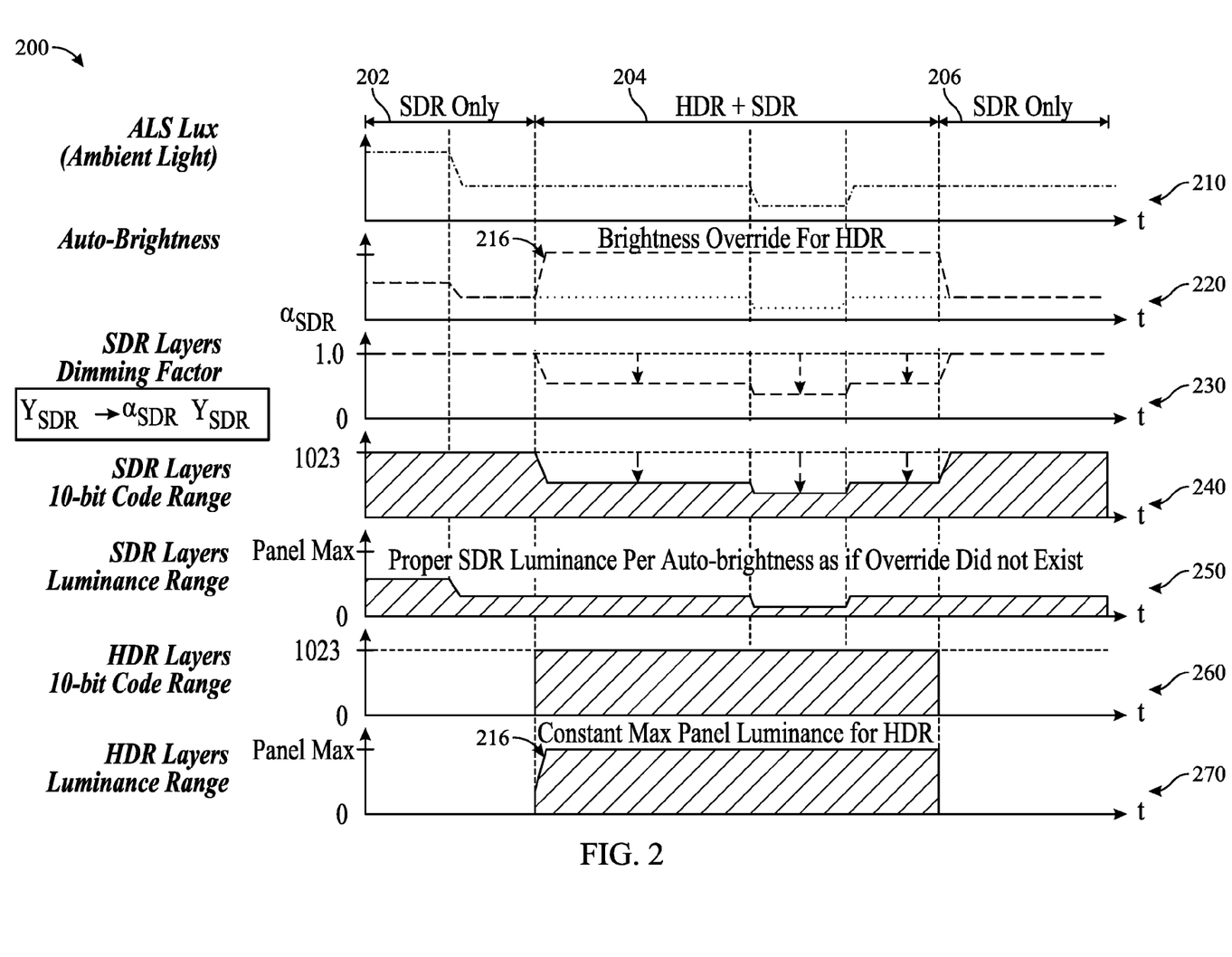
FIG. 2 illustrates example brightness profiles of different layers for transitions between standard dynamic range (SDR) and high dynamic range (HDR) content, in accordance with certain aspects of the present disclosure.

FIG. 2 illustrates example brightness profiles 200 of different layers for transitions between SDR and HDR content, in accordance with certain aspects of the present disclosure. The brightness profiles 200 include several timelines 210-270 for respective layers in three sections: a first SDR only section 202 (where only SDR content is displayed), a middle SDR and HDR combined section 204 (where SDR and HDR content is displayed), and a second SDR only section 206 (where only SDR content is displayed). The brightness profiles 200 includes an ambient light timeline 210, an auto-brightness timeline 220, a dimming factor timeline 230 for SDR layers, an SDR 10-bit code range timeline 240, an SDR luminance (i.e., brightness) range timeline 250, an HDR 10-bit code range timeline 260, and an HDR luminance (i.e., brightness) range timeline 270.

The profiles 200 illustrate how a display panel may change its luminance or brightness in response to changes in incoming images (i.e., changing between SDR only content and SDR and HDR content) and ambient light. For example, timelines 250 and 270 respectively illustrate the output luminance for SDR and HDR content (the output luminance may be superpositioned when both are displayed). Therefore, when the display panel needs to transition from the first SDR only section 202 to the SDR and HDR combined section 204, the output luminance needs to be adjusted to provide a smooth change. For example, the auto-brightness timeline 220 illustrates an example of a luminance output, which dims down when the ambient light dims in the first SDR only section 202, and ramps up to a maximum level in the SDR and HDR combined section 204, and dims back to the previous brightness level in the second SDR only section 206. The present disclosure provides techniques for producing a smooth transition between sections 202, 204, and 206.

Referring first to the timelines 210 and 220, during the SDR and HDR combined section 204, the display panel outputs its maximum brightness for the HDR content, as shown in the auto-brightness timeline 220. While in the first SDR section 202 and the second SDR section 204, the auto-brightness timeline 220 follows the changes in the ambient light timeline 210, where the auto-brightness is dimmed when the ambient light is dimmed.

Referring to the dimming factor timeline 230, excess SDR luminance may be compensated during HDR playback, at least in view of the ambient light profile 210. For example, when the ambient light decreases, the SDR luminance may decrease accordingly. The compensation of the SDR luminance is illustrated in the reduced quantization levels for SDR in the SDR 10-bit code range timeline 240 (sharing a common profile with the timeline 230 but having a different quantification unit in the vertical axis).

In cases where no HDR content is to be displayed, the SDR luminance range timeline 250 shows the luminance for SDR layers based on the auto-brightness timeline 220 (the dotted line without the brightness override for HDR). As shown, the output luminance is a fraction of the total panel output capacity, as indicated by the "panel max" mark in the vertical axis. The timeline 250 is used as a reference timeline for comparing to HDR timelines 260 and 270.

Turning to the HDR 10-bit code range timeline 260 and the HDR luminance range timeline 270, as shown in the HDR luminance range timeline 270, the display panel outputs at the maximum luminance when displaying the 10-bit HDR content. In some aspects, the HDR luminance range timeline 270 includes an incremental profile 216, which ramps up the brightness from the SDR luminance shown in timeline 250 to the maximum luminance. The incremental profile 216 may be linear or of another curve profile.

Figure 3:
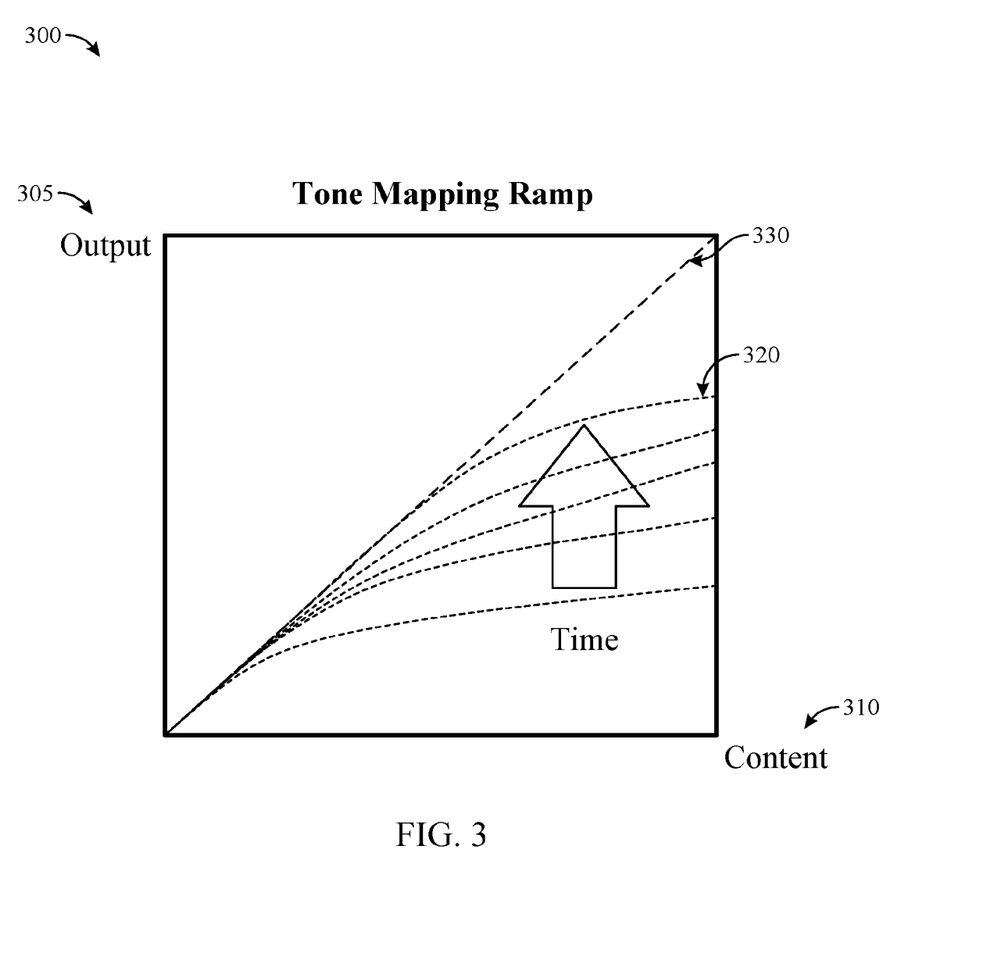
FIG. 3 illustrates example tone mapping curves for use in transitions from SDR to HDR content, in accordance with certain aspects of the present disclosure.

FIG. 3 illustrates example tone mapping curves for use in transitions from SDR to HDR content, in accordance with certain aspects of the present disclosure. The horizontal axis represents content 310, which may represent an input luminance factor in logarithmic scale across light intensities. The vertical axis represents output 305, which may represent an output luminance factor in logarithmic scale across light intensities. The relationship between the two may be manipulated to improve the contrast, saturation, or other aspects of the images being displayed. The line 330 represents a neutral output (i.e., no additional processing or direct output). A tone mapping curve is usually applied to adapt or adjust image data of a native histogram (or intensity distribution across a spectrum) to a specific display panel to simulate human visual experience. Because image content may have different native histograms and display panels may have different dynamic ranges or luminance ranges, different tone mapping curves are needed to avoid pixels being too dark or too bright.

In the context of the present disclosure, the tone mapping curves are generated to smooth the transition between SDR and HDR images, in addition to the common functionalities. There are different optional tone mapping curves 320 that can be implemented. For example, an "S" shaped curve may enhance contrast in the middle range and gradually compress highlights and shadows. During the transition between SDR and HDR images, the HDR images may use one or more of the example tone mapping curves 320 to gradually change the output 305 in time. For example, one of the tone mapping curves 320 may be applied to some SDR images to simulate the output luminance range of that of HDR images to meet with a higher peak luminance, instead of using a tone mapping curve specific to SDR images.

Figure 4:
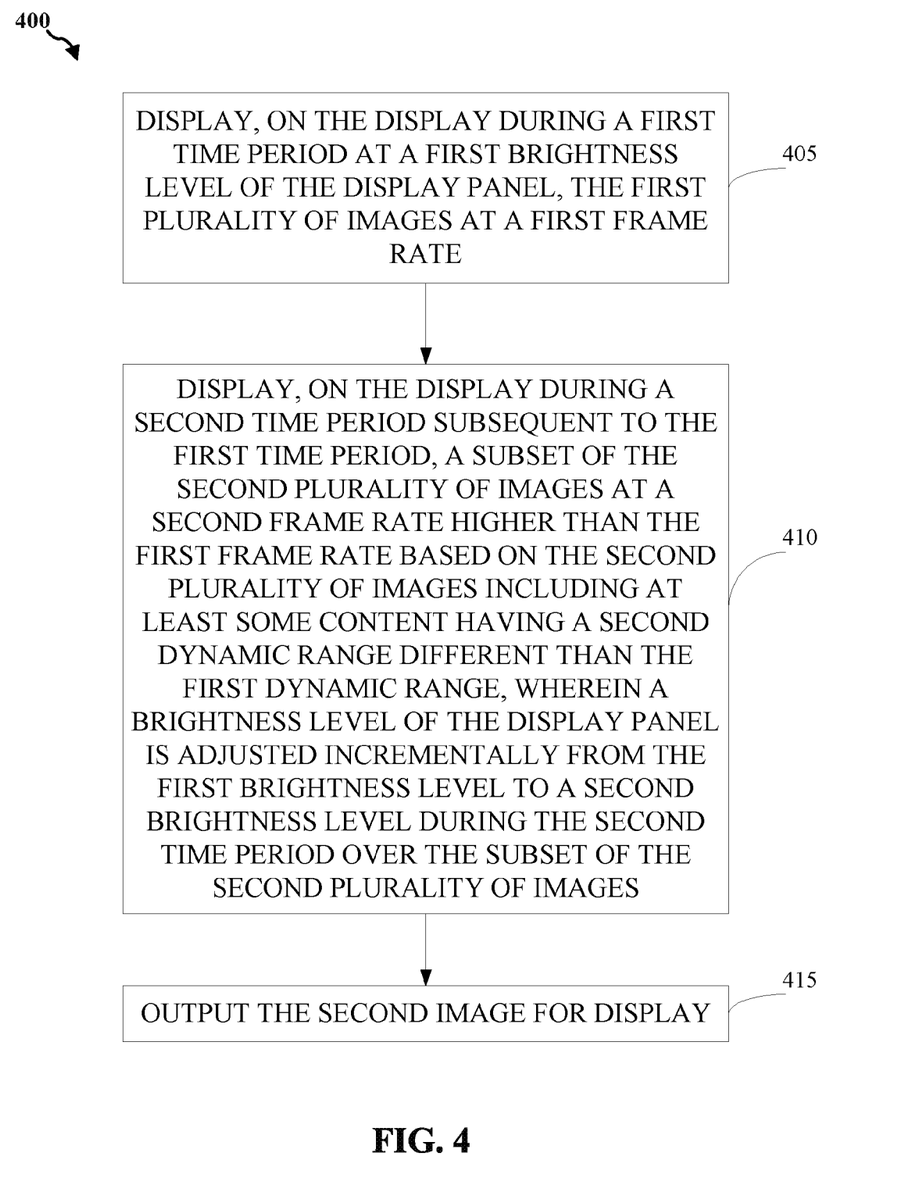
FIG. 4 illustrates a flow diagram of example operations for displaying images of different dynamic ranges, in accordance with certain aspects of the present disclosure.

FIG. 4 is an example flow diagram illustrating example operations 400 for graphic processing, such as transitioning between displaying a first plurality of images including content having a first dynamic range (e.g., SDR) and a second plurality of images including at least some content having a second dynamic range (e.g., HDR) different than the first dynamic range. In certain aspects, the operations 400 may be performed by a CPU or GPU, such as the CPU 122 or the GPU 120 of FIG. 1. The operations 400 may be triggered by detecting incoming HDR content while playing SDR content.

The operations 400 may begin, at 405, by displaying, on a display during a first time period at a first brightness level of the display panel, the first plurality of images at a first frame rate. For example, the first plurality of images are SDR images.

At 410, a first subset of the second plurality of images is displayed, on the display during a second time period subsequent to the first time period, at a second frame rate higher than the first frame rate based on the second plurality of images including at least some content having a second dynamic range different than the first dynamic range. For example, the second dynamic range corresponds to HDR and the second plurality of images include HDR images. A brightness level of the display panel is adjusted incrementally from the first brightness level to a second brightness level during the second time period over the subset of the second plurality of images.

At 415, a second subset of the second plurality of images is displayed, on the display during a third time period subsequent to the second time period at the second brightness level of the display panel, at a third frame rate lower than the second frame rate. For example, the second subset of the HDR images are displayed at the third time period at the third frame rate. In some cases, the third frame rate is 30 Hz, and the second frame rate is 120 Hz.

In certain aspects, the second dynamic range corresponds to at least one of different maximum brightness, different maximum saturation, or different maximum contrast ratio as compared to the first dynamic range. For example, the second dynamic range is HDR having or requiring a maximum brightness that is supported by the display, such as 800 nits. By comparison, the SDR images may be displayed at a lower brightness than the HDR images, such as 100 nits. Similarly, the HDR images may have greater saturation, or a greater contrast ratio than that of SDR images.

In certain aspects, each of the subset of the second plurality of images is displayed with a different brightness level of the display panel. For example, for the HDR layers, gradient brightness levels are calculated between existing luminance and the target luminance level, such as average content luminance to be used in HDR playback. When the transition frame rate is 120 Hz and the transition duration is 1000 ms, for example, 120 gradient brightness levels are generated. The brightness levels span from the initial SDR brightness to the maximum output brightness of the display panel. For example, when the SDR images are displayed at 80 nits, and the maximum brightness is 1200 nits, the 120 gradient brightness levels span from 80 nits to 1200 nits at 9.3 nits interval.

In certain aspects, a number of brightness levels of the display panel used for displaying the subset of the second plurality of images during the second time period is based on a duration of the second time period. For example, the duration may be 500 ms, 1000 ms, or the like. The number of brightness levels may correspond to the product of the frame rate during the second time period and the duration thereof. When the second time period is 1000 ms and the frame rate is 120 Hz, there may be 120 brightness levels varying from the SDR brightness level to the maximum panel luminance for the HDR images.

In certain aspects, the brightness level of the display is adjusted linearly during the second time period. For example, as shown in FIG. 2, the profile 216 of the HDR luminance range timeline 270 illustrates a linear adjustment. In some cases, the adjustment may be implemented using non-linear profiles.

In certain aspects, a first tone mapping curve is used for displaying a first one or more of the subset of the second plurality of images during the second time period and a second tone mapping curve is used for displaying a second one or more of the subset of the second plurality of images during the second time period. For example, the first tone mapping curve is used for displaying SDR images and the second tone mapping curve is used for transitioning from the SDR images to the HDR images. In some cases, multiple tone mapping curves may be used in the place of the second tone mapping curve during the second time period. The number of the multiple tone mapping curve may vary based on the duration length of the second time period. For example, when the second time period is 1000 ms or more, two or more tone mapping curves may be generated for respective low and high brightness levels, assuming each tone mapping curve handles 60 different brightness levels. When the second time period is 500 ms, one tone mapping curve may be generated for both low and high brightness levels.

In certain aspects, a number of tone mapping curves used for displaying the subset of the second plurality of images during the second time period is based on a duration of the second time period. For example, during the second time period corresponding to the transition from the SDR to HDR images, two or more tone mapping curves may be used. For example, when the generated gradient brightness levels span from 80 nits to 1200 nits in the previous example, there can be two tone mapping curves, one for brightness levels 80-400 nits, the other for brightness levels 401 nits to 1200 nits.

In certain aspects, a series of tone mapping curves are used for displaying the subset of the second plurality of images during the second time period, the series of tone mapping curves having increasing curve peaks. For example, the curve peaks may correspond to the incrementally increasing maximum output luminance during the transition to displaying HDR images (e.g., ramping up on the profile 216 to reach the maximum panel luminance for HDR shown in timeline 270 of FIG. 2). That is, for each of the frames generated for the SDR to HDR transition, the tone-mapping curve may be adjusted for the varying peak brightness. The more frequent such adjustment, the smoother transition a user may experience.

In some cases, for HDR content, the gradient brightness levels and tone mapping curves may be determined by lab tuning using transition time interval, HDR content metadata, display panel brightness curve, and/or based on other information. For SDR content, the SDR layers may scale pixel values using a gain factor or a look-up-table (LUT), either of which may operate the scaling in a linear light domain.

In certain aspects, the luminance variations during the SDR-HDR-SDR transition may employ various techniques, including pulse-width-modulation (PWM) and direct-current (DC) dimming, among others. PWM dimming uses a blackout period and may not be suitable in low luminance situations (e.g., causing flickering). DC dimming may cause color changes at high luminance situations. Selecting one of the two techniques may depend on the desired luminance range. A combination of these two luminance control techniques may be used together for a wide range of luminance control.

In certain aspects, the second plurality of images includes at least some of the content having the first dynamic range from the first plurality of images. For example, during the transition and/or during the display of the HDR content, some of the SDR images are displayed, such as during the second and/or third time period. These at least some of the content having the first dynamic range is displayed during the first time period at a first brightness based on the first brightness level of the display and pixel values of pixels in the first plurality of images corresponding to the at least some of the content having the first dynamic range (e.g., SDR). Pixel values of pixels in the second plurality of images (e.g., HDR images) corresponding to the at least some of the content having the first dynamic range are adjusted as compared to the pixel values of the pixels in the first plurality of images so that the at least some of the content having the first dynamic range is displayed during the second time period at the first brightness. In some cases, the pixel values of the pixels in the second plurality of images are adjusted using at least one of: a gain factor or a look-up-table (LUT). For example, the gain factor or the LUT enables the display panel to ensure that the SDR images (to be displayed in the second time period and/or third time period, such as during the SDR and HDR combined section 204 in FIG. 2), even when the display panel is operating at high luminance to display HDR content, may be, for example DC dimmed (or otherwise adjusted) to maintain the SDR brightness for achieving a constant visual effect for the SDR images during the second and/or third time period. For example, during the first time period, the panel brightness may be set at a lower value X, and the RGB pixel values may be at a normal level for the SDR images. During the second and/or third time period, the panel brightness may be set at a value higher than X, and accordingly, the RGB pixel values for the SDR images may be reduced, so that during the first time period and the second and/or third time period, the SDR images have the same approximate brightness, which is based on the combination of the RGB pixel values and the overall display panel brightness.

Figure 5:
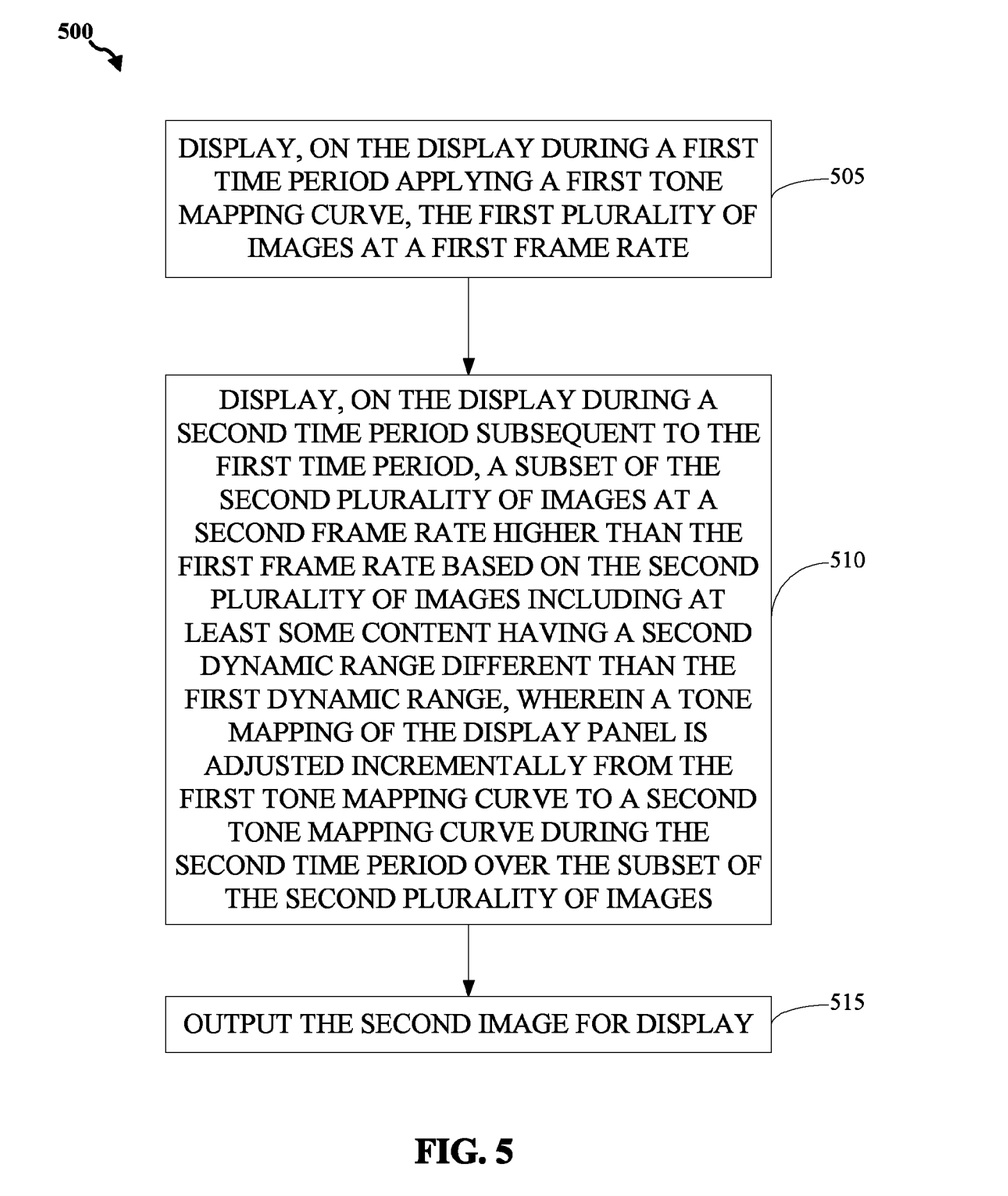
FIG. 5 illustrates a flow diagram of example operations for displaying images of different dynamic ranges, in accordance with certain aspects of the present disclosure.

FIG. 5 illustrates a flow diagram illustrating example operations 500 for graphic processing, such as transitioning between displaying a first plurality of images including content having a first dynamic range (e.g., SDR) and a second plurality of images including at least some content having a second dynamic range (e.g., HDR) different than the first dynamic range. In certain aspects, the operations 500 may be performed by a CPU or GPU, such as the CPU 122 or the GPU 120 of FIG. 1. The operations 500 may be triggered by detecting incoming HDR content while playing SDR content.

The operations 500 may begin, at 505, by displaying, on a display during a first time period applying a first tone mapping curve, the first plurality of images at a first frame rate. For example, the first plurality of images are SDR images. The first tone mapping curve may have a curve peak for the SDR images.

At 510, a first subset of the second plurality of images is displayed, on the display during a second time period subsequent to the first time period, at a second frame rate higher than the first frame rate based on the second plurality of images including at least some content having a second dynamic range different than the first dynamic range. For example, the second dynamic range corresponds to HDR and the second plurality of images include HDR images. A tone mapping curve of the display panel is adjusted incrementally from the first tone mapping curve (i.e., for SDR images) to a second tone mapping curve (i.e., for HDR images) during the second time period over the subset of the second plurality of images.

At 515, a second subset of the second plurality of images is displayed, on the display during a third time period subsequent to the second time period at the second brightness level of the display panel, at a third frame rate lower than the second frame rate. For example, the second subset of the HDR images are displayed at the third time period at the third frame rate. The second plurality of images uses the second tone mapping curve for displaying HDR images.

The processes described above transitioning from SDR to HDR content is equally applicable to transitioning from HDR to SDR content. For example, after transitioning from HDR to SDR, the SDR content may be displayed at the original SDR frame rate, brightness, and other SDR parameters.

In one configuration, a method or apparatus for graphics processing is provided. The apparatus may be a CPU, a GPU, or some other processor that can perform graphics processing. In one aspect, the apparatus may be the GPU 120 within the device 104 or may be some other hardware within device 104 or another device.

The subject matter described herein can be implemented to realize one or more benefits or advantages. For instance, the described graphics processing techniques can be used by a GPU, a CPU, or some other processor that can perform graphics processing to implement the state information techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A device operable to transition between displaying a first plurality of images including content having a first dynamic range and a second plurality of images including at least some content having a second dynamic range different than the first dynamic range, the device comprising:
   a display;
   at least one memory; and
   at least one processor coupled to the memory, the at least one memory and the at least one processor being configured to:
   display, on the display during a first time period at a first brightness level of the display, the first plurality of images at a first frame rate;
   display, on the display during a second time period subsequent to the first time period, a first subset of the second plurality of images at a second frame rate higher than the first frame rate based on the second plurality of images including at least some content having a second dynamic range different than the first dynamic range, wherein a brightness level of the display is adjusted incrementally from the first brightness level to a second brightness level during the second time period over the subset of the second plurality of images; and
   display, on the display during a third time period subsequent to the second time period at the second brightness level of the display, a second subset of the second plurality of images at a third frame rate lower than the second frame rate.

2. The device of claim 1, wherein the second dynamic range corresponds to at least one of different maximum brightness, different maximum saturation, or different maximum contrast ratio as compared to the first dynamic range.

3. The device of claim 1, wherein each of the subset of the second plurality of images is displayed with a different brightness level of the display.

4. The device of claim 1, wherein a number brightness levels of the display used for displaying the subset of the second plurality of images during the second time period is based on a duration of the second time period.

5. The device of claim 1, wherein the brightness level of the display is adjusted linearly during the second time period.

6. The device of claim 1, wherein a first tone mapping curve is used for displaying a first one or more of the subset of the second plurality of images during the second time period and a second tone mapping curve is used for displaying a second one or more of the subset of the second plurality of images during the second time period.

7. The device of claim 1, wherein a number of tone mapping curves used for displaying the subset of the second plurality of images during the second time period is based on a duration of the second time period.

8. The device of claim 1, wherein a series of tone mapping curves are used for displaying the subset of the second plurality of images during the second time period, the series of tone mapping curves having increasing curve peaks.

9. The device of claim 1, wherein the second plurality of images includes at least some of the content having the first dynamic range from the first plurality of images, wherein the at least some of the content having the first dynamic range is displayed during the first time period at a first brightness based on the first brightness level of the display and pixel values of pixels in the first plurality of images corresponding to the at least some of the content having the first dynamic range, and wherein pixel values of pixels in the second plurality of images corresponding to the at least some of the content having the first dynamic range are adjusted as compared to the pixel values of the pixels in the first plurality of images so that the at least some of the content having the first dynamic range is displayed during the second time period at the first brightness.

10. The device of claim 9, wherein the pixel values of the pixels in the second plurality of images are adjusted using at least one of: a gain factor or a look-up-table.

11. A method for transitioning between displaying a first plurality of images including content having a first dynamic range and a second plurality of images including at least some content having a second dynamic range different than the first dynamic range on a display panel, the method comprising:
displaying, on the display during a first time period at a first brightness level of the display panel, the first plurality of images at a first frame rate;
displaying, on the display during a second time period subsequent to the first time period, a first subset of the second plurality of images at a second frame rate higher than the first frame rate based on the second plurality of images including at least some content having a second dynamic range different than the first dynamic range, wherein a brightness level of the display panel is adjusted incrementally from the first brightness level to a second brightness level during the second time period over the subset of the second plurality of images; and
displaying, on the display during a third time period subsequent to the second time period at the second brightness level of the display panel, a second subset of the second plurality of images at a third frame rate lower than the second frame rate.

12. The method of claim 11, wherein the second dynamic range corresponds to at least one of different maximum brightness, different maximum saturation, or different maximum contrast ratio as compared to the first dynamic range.

13. The method of claim 11, wherein each of the subset of the second plurality of images is displayed with a different brightness level of the display panel.

14. The method of claim 11, wherein a number brightness levels of the display panel used for displaying the subset of the second plurality of images during the second time period is based on a duration of the second time period.

15. The method of claim 11, wherein the brightness level of the display is adjusted linearly during the second time period.

16. The method of claim 11, wherein a first tone mapping curve is used for displaying a first one or more of the subset of the second plurality of images during the second time period and a second tone mapping curve is used for displaying a second one or more of the subset of the second plurality of images during the second time period.

17. The method of claim 11, wherein a number of tone mapping curves used for displaying the subset of the second plurality of images during the second time period is based on a duration of the second time period.

18. The method of claim 11, wherein a series of tone mapping curves are used for displaying the subset of the second plurality of images during the second time period, the series of tone mapping curves having increasing curve peaks.

19. The method of claim 11, wherein the second plurality of images includes at least some of the content having the first dynamic range from the first plurality of images, wherein the at least some of the content having the first dynamic range is displayed during the first time period at a first brightness based on the first brightness level of the display and pixel values of pixels in the first plurality of images corresponding to the at least some of the content having the first dynamic range, and wherein pixel values of pixels in the second plurality of images corresponding to the at least some of the content having the first dynamic range are adjusted as compared to the pixel values of the pixels in the first plurality of images so that the at least some of the content having the first dynamic range is displayed during the second time period at the first brightness.

20. The method of claim 19, wherein the pixel values of the pixels in the second plurality of images are adjusted using at least one of: a gain factor or a look-up-table.

21. An apparatus for transitioning between displaying a first plurality of images including content having a first dynamic range and a second plurality of images including at least some content having a second dynamic range different than the first dynamic range on a display panel, the apparatus comprising:
means for displaying, on the display during a first time period at a first brightness level of the display panel, the first plurality of images at a first frame rate;
means for displaying, on the display during a second time period subsequent to the first time period, a first subset of the second plurality of images at a second frame rate higher than the first frame rate based on the second plurality of images including at least some content having a second dynamic range different than the first dynamic range, wherein a brightness level of the display panel is adjusted incrementally from the first brightness level to a second brightness level during the second time period over the subset of the second plurality of images; and
means for displaying, on the display during a third time period subsequent to the second time period at the second brightness level of the display panel, a second subset of the second plurality of images at a third frame rate lower than the second frame rate.

22. The apparatus of claim 21, wherein the second dynamic range corresponds to at least one of different maximum brightness, different maximum saturation, or different maximum contrast ratio as compared to the first dynamic range.

23. The apparatus of claim 21, wherein each of the subset of the second plurality of images is displayed with a different brightness level of the display panel.

24. The apparatus of claim 21, wherein a number brightness levels of the display panel used for displaying the subset of the second plurality of images during the second time period is based on a duration of the second time period.

25. The apparatus of claim 21, wherein the brightness level of the display is adjusted linearly during the second time period.

26. A non-transitory computer-readable medium including instructions that when executed by a computing device, cause the computing device to:
- display, on a display panel during a first time period at a first brightness level of the display panel, a first plurality of images at a first frame rate;
- display, on the display panel during a second time period subsequent to the first time period, a first subset of a second plurality of images at a second frame rate higher than the first frame rate based on the second plurality of images including at least some content having a second dynamic range different than a first dynamic range, wherein a brightness level of the display panel is adjusted incrementally from the first brightness level to a second brightness level during the second time period over the subset of the second plurality of images; and
- display, on the display panel during a third time period subsequent to the second time period at the second brightness level of the display panel, a second subset of the second plurality of images at a third frame rate lower than the second frame rate.

27. The non-transitory computer-readable medium of claim 26, further comprising instructions that when executed by the computing device, cause the computing device to use a first tone mapping curve for displaying a first one or more of the subset of the second plurality of images during the second time period and a second tone mapping curve is used for displaying a second one or more of the subset of the second plurality of images during the second time period.

28. The non-transitory computer-readable medium of claim 26, further comprising instructions that when executed by the computing device, cause the computing device to use a number of tone mapping curves for displaying the subset of the second plurality of images during the second time period is based on a duration of the second time period.

29. The non-transitory computer-readable medium of claim 26, further comprising instructions that when executed by the computing device, cause the computing device to use a series of tone mapping curves for displaying the subset of the second plurality of images during the second time period, the series of tone mapping curves having increasing curve peaks.

30. The non-transitory computer-readable medium of claim 26, wherein the second plurality of images includes at least some of the content having the first dynamic range from the first plurality of images, wherein the at least some of the content having the first dynamic range is displayed during the first time period at a first brightness based on the first brightness level of the display and pixel values of pixels in the first plurality of images corresponding to the at least some of the content having the first dynamic range, and wherein pixel values of pixels in the second plurality of images corresponding to the at least some of the content having the first dynamic range are adjusted as compared to the pixel values of the pixels in the first plurality of images so that the at least some of the content having the first dynamic range is displayed during the second time period at the first brightness.

\* \* \* \* \*